US007005069B2

(12) United States Patent
Shell (10) Patent No.: US 7,005,069 B2
(45) Date of Patent: Feb. 28, 2006

(54) APPARATUS AND METHOD FOR AERATION OF WASTEWATER

(75) Inventor: Gerald L. Shell, Eagleville, TN (US)

(73) Assignee: Passaic Valley Sewerage Commissioners, Newark, NJ (US)

( * ) Notice: Subject to any disclaimer, the term of this patent is extended or adjusted under 35 U.S.C. 154(b) by 0 days.

(21) Appl. No.: 10/832,883

(22) Filed: Apr. 27, 2004

(65) Prior Publication Data

US 2005/0236326 A1    Oct. 27, 2005

(51) Int. Cl.
    *C02F 3/00*    (2006.01)
(52) U.S. Cl. .................. 210/604; 210/220; 210/196; 210/197; 210/150; 210/620
(58) Field of Classification Search ............. 210/150, 210/220, 196, 197, 604, 620
    See application file for complete search history.

(56) References Cited

U.S. PATENT DOCUMENTS

| 4,163,712 A   |   | 8/1979 | Smith |         |
|---------------|---|--------|-------|---------|
| 4,341,633 A   |   | 7/1982 | Walder |        |
| 4,430,224 A   |   | 2/1984 | Fuchs |         |
| 5,186,837 A   | * | 2/1993 | Nikolic et al. | 210/614 |
| 5,240,600 A   |   | 8/1993 | Wang et al. |    |
| 5,302,286 A   | * | 4/1994 | Semprini et al. | 210/610 |
| 6,372,140 B1  | * | 4/2002 | Kelly | 210/629 |
| 6,517,723 B1  | * | 2/2003 | Daigger et al. | 210/605 |
| 2002/0108904 A1 | * | 8/2002 | Blackburn | 210/604 |

OTHER PUBLICATIONS http://www.tideflex.com/product_pages/check_valves/all_rubber/main.htm, downloaded Jun. 17, 2005.*

* cited by examiner

*Primary Examiner*—Chester T. Barry
(74) *Attorney, Agent, or Firm*—Hoffmann & Baron, LLP (57) ABSTRACT

A wastewater treatment plant includes (i) an aeration vessel having a bottom portion, a top portion and a side portion disposed therebetween to hold a quantity of wastewater, the top portion and the bottom portion being disposed at least 20 feet apart from one and the other to define a depth, the depth being capable of being substantially filled with wastewater; (ii) a coarse bubble diffuser disposed proximal to the bottom portion, the diffuser having a plurality of orifices orientated horizontally toward the side portion; the orifices having a diameter of at least 0.125 inches; and (iii) a source of enriched oxygen gas in fluid communication with the diffuser; wherein the enriched oxygen gas exiting the orifices prevents settling of solid components of the wastewater without the use of a mechanical mixer. Further, the depth of the aeration vessel may be at least about 20 feet or deeper, for instance at least about 30 feet or deeper. A method for treating wastewater includes the steps of (i) providing a first deep and enclosed aeration vessel; the vessel having a depth of at least about 20 feet; (ii) providing wastewater having dissolved solids to substantially fill the vessel; and (iii) providing enriched oxygen gas at the bottom of the vessel through a coarse bubble diffuser at a sufficient flow to prevent settling of the solids without then need for a mechanical mixer.

19 Claims, 4 Drawing Sheets

APPARATUS AND METHOD FOR AERATION OF WASTEWATER

FIELD OF THE INVENTION

The present invention relates to aeration of wastewater for removal of organic pollutants. More particularly, the present invention relates to the use of a coarse bubble diffuser for aerating deep aeration tanks.

BACKGROUND OF RELATED TECHNOLOGY

A number of different methods have been employed for wastewater treatment. These methods involve biochemical oxidation by bacteria, i.e., biomass, to convert organic pollutants to additional biomass, carbon dioxide and water. A common example is the activated sludge process which utilizes an aeration tank or vessel, a setting tank or clarifier, and a pump or pumps to recycle biomass. Wastewater is mixed with active biomass in the aeration tank where biochemical oxidation takes place. The effluent from the aeration tank is then delivered to the settling tank where the biomass settles and some of it is returned to the aeration tank. Treated water from the settling tank exits generally at the top of the tank and is released for discharge or subsequent treatment.

In order for the biochemical oxidation reaction to take place without odor, oxygen is supplied to the mixture in the aeration tank. The demand for oxygen, i.e., oxygen transfer, is dependent upon the amount of biodegradable pollutants available to the biomass or bacteria. Oxygen is made available to the biomass in the form of dissolved oxygen by dissolution of oxygen into the mixture from the aerating gas. Air is the most common source of gas for dissolution of oxygen into the mixture when using open-top aeration tanks. High-purity oxygen can also be used as the aerating gas, but the aeration tank or basin must usually enclose the gas space above the mixture in order to achieve a high oxygen utilization. Venting of the aeration tank or basin is necessary to prevent the buildup of carbon dioxide produced in the bio-oxidation process occurring in the enclosed aeration tank.

In an oxygen-enriched, activated sludge process, the aeration tank is usually separated into two or more closed-tank chambers which operate in series. Wastewater and sludge returned from the settling tank are input to the first chamber and the mixed liquor flows through subsequent chambers in the series and eventually to the settling tank or clarifier. High-purity oxygen gas containing from 60 to 99% oxygen by volume is normally input to the gas space of the first chamber or to the recirculating gas going to the first chamber compressor. The headspace gas flows through the gas space of subsequent chambers concurrent with the mixture. Some versions of the process allow wastewater, return sludge, and high-purity oxygen to be input to any or all chambers of the reactor. High-purity oxygen is usually supplied to the oxygen activated sludge process from an on-site oxygen generating plant or it may be supplied directly from a commercial pipeline.

Various types of mixing devices are used to enhance oxygen transfer to the mixture of each chamber where dissolved oxygen is consumed by the biological reactions. For example, U.S. Pat. No. 4,163,712 describes the use of pressurized water that has been oxygen-enriched as an aeration source by introducing the oxygenated water into the bottom of an aeration tank via a sparger. The oxygenated water is supplied at high velocity so that the water acts as "jets" to provide mixing within the aeration tank while also providing a source of oxygen. U.S. Pat. No. 4,341,633 describes the use of surface aerators and submerged mixers for providing enriched oxygen gas to an enclosed aeration tank. The use of the submerged mixers is described as being necessary for the distribution of the gas throughout the tank. U.S. Pat. No. 4,430,224 describes the use of oxygen-rich gas with enclosed aeration tanks. Oxygen-enriched gas is circulated to a gas distributor located at the bottom of the aeration tank. Mixers are also provided for distributing the introduced gas within the mixture. The above-described systems are typically suitable for shallow aeration tanks, e.g., tanks with a liquid depth of about 15 feet or less.

U.S. Pat. No. 5,240,600 describes the aeration of enclosed, cylindrical bioreactors, which are described as having a depth from 5 to 200 feet. Air is introduced at the bottom of the bioreactor through a sparger to deliver coarse bubbles, i.e., bubble diameter greater than 80 microns, and a biological contactor for further holding the microorganisms within the mixture contained in the deep bioreactor. Additionally, the wastewater is described as being further treated with fine gas bubbles with a bubble diameter much smaller than 80 microns delivered under high velocity to further provide oxygen enrichment. The described system of the '60 Patent is quite complicated with numerous equipment and recycles, making the process expensive and difficult to operate.

Accordingly, there is a need for economical aeration means for deep tanks, such as tanks with liquid over twenty feet in depth without the complication of added equipment to ensure adequate mixing and oxygen supply to microorganism within the aeration tank.

SUMMARY OF THE INVENTION

The present invention is directed to a wastewater treatment plant and a process for treating wastewater through the use of enriched oxygen gas delivered into deep aeration tanks through coarse bubble diffusers. The use of coarse bubble diffusers for supplying the enriched oxygen gas reduces operating costs and complexity as no additional mechanical mixers are required in the deep aeration tanks.

In one aspect of the present invention a wastewater treatment plant is provided. The wastewater treatment plant includes (i) an aeration vessel having a bottom portion, a top portion and a side portion disposed therebetween to hold a quantity of wastewater, the top portion and the bottom portion being disposed at least 20 feet apart from one and the other to define a depth, the depth being capable of being substantially filled with wastewater; (ii) a coarse bubble diffuser disposed proximal to the bottom portion, the diffuser having a plurality of orifices orientated horizontally toward the side portion; the orifices having a diameter of at least 0.125 inches; and (iii) a source of enriched oxygen gas in fluid communication with the diffuser; wherein the enriched oxygen gas exiting the orifices prevents settling of solid components of the wastewater without the use of a mechanical mixer. Further, the depth of the aeration vessel may be at least about 20 feet or deeper, for instance at least about 30 feet or deeper.

The source of enriched oxygen-containing gas includes (i) a compressor having an inlet gas flow and a outlet gas flow, the outlet gas flow being at higher pressure than the inlet gas flow, wherein the inlet gas flow comprises a first source of oxygen-rich gas having at least 90 mole percent oxygen and a second source of oxygen-rich gas having greater than 70 mole percent oxygen. The first source is the high purity oxygen source. The second source is a recycled source taken from gas that has exited the gas diffuser.

In another aspect of the present invention, a method for treating wastewater is provided. The method includes the steps of (i) providing a first deep and enclosed aeration vessel; the vessel having a depth of at least about 20 feet; (ii) providing wastewater to substantially fill the vessel; and (iii) providing enriched oxygen gas at the bottom of the vessel through a coarse bubble diffuser at a sufficient flow to prevent settling of the solids without the need for a mechanical mixer. Further, the depth of the aeration vessel may be at least about 20 feet or deeper, for instance at least about 30 feet or deeper.

The step of providing the enriched oxygen gas may further include the step of providing a plurality of orifices at the coarse bubble diffuser, the orifices having a diameter of at least about 0.125 inches to provide a plurality of gas bubbles having a diameter of at least about 0.125 inches.

Desirably, the flow of the enriched gas flow is at least about 0.21 standard cubic feet of gas per square-foot of cross-sectional area within the aeration vessel.

Further, a second deep and enclosed aeration vessel may be provided with the second tank having a depth of at least about 20 feet; the second vessel having a coarse bubble diffuser for supplying enriched oxygen gas at a sufficient flow to prevent settling of the solids without the need for a mechanical mixer, wherein the wastewater flows from the first aeration vessel to the second aeration vessel. Desirably, the enriched oxygen gas flow is distributed to the diffusers in both the first and second aeration vessels.

The high purity oxygen gas includes any oxygen source having an oxygen content of at least about 90 mole percent. The enriched gas is delivered by a compressor for supplying the enriched oxygen gas to the diffusers. Additionally, the enriched oxygen gas may further include gas contained within a vapor space above the wastewater within the aeration tanks, the gas contained with the vapor space having an oxygen content of at least about 60 mole percent.

The method and treatment plant of the present invention are useful with wastewater having a biological oxygen demand, i.e., $BOD_5$, of at least about 150 mg/L.

The method of the present invention also provides a low energy method for treating wastewater as the energy requirement for the treating of the waste water is at least about 3.5 pounds of oxygen per horsepower-hour, or greater, based on standard conditions (ASCE) and air as the oxygen source.

DETAILED DESCRIPTION OF THE INVENTION

Figure 1:
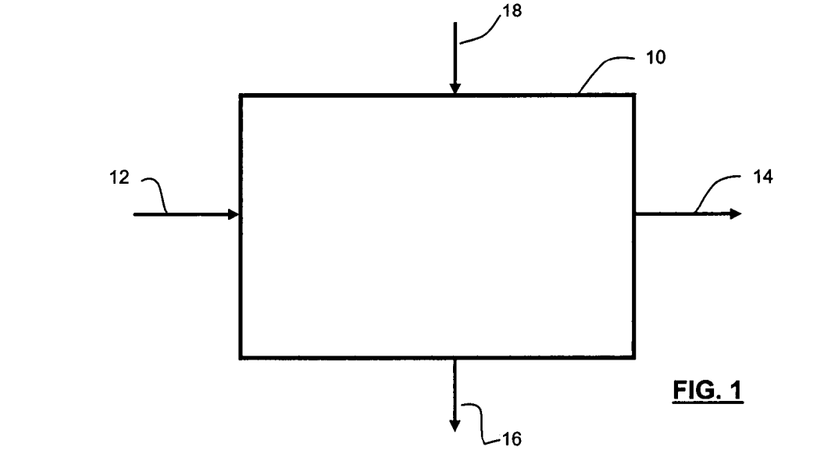
FIG. 1 is a schematic of a wastewater treatment plant according to the present invention.

FIG. 1 depicts a wastewater treatment plant 10 according to the present invention. Wastewater 12 is introduced into the plant 10 and is treated with oxygen-enriched gas 18. As described in further detail below, the oxygen rich gas is useful for removing organic materials from the wastewater 12 through a biological process where microorganism utilize the organic materials. Treated or clean water 14 exits the treatment plant 10. A sludge 16, which generally represents a biomass of the microorganisms, is also withdrawn.

The amount of organic material, especially putrescible organic material, in sewage is measured by the biochemical oxygen demand, or $BOD_5$. The more organic material there is in the sewage, the higher the $BOD_5$. $BOD_5$ is the amount of oxygen required by microorganisms to decompose the organic substances in sewage. $BOD_5$ is the amount of oxygen required over an five day period for the biological reaction, which is an industrial standard measurement.

The wastewater 12 may contain a wide variation of contaminants. For example, the $BOD_5$ may vary from about 50 mg/L to about 5,000 mg/L, or more. Often, the $BOD_5$ is from about 150 mg/L to about 350 mg/L. Total suspended solids (TSS) is a measure of nonsoluble material present in the wastewater 12, and the TSS can vary from about 50 mg/L to about 5,000 mg/L, or more. More often, the TSS is from about 150 mg/L to about 350 mg/L. Volatile suspended solids (VSS) is a measure of the combustible material present in the wastewater 12 and can vary from about 100 mg/L to about 4,000 mg/L, or more. More often, the VSS is from about 100 mg/L to about 275 mg/L.

Figure 2:
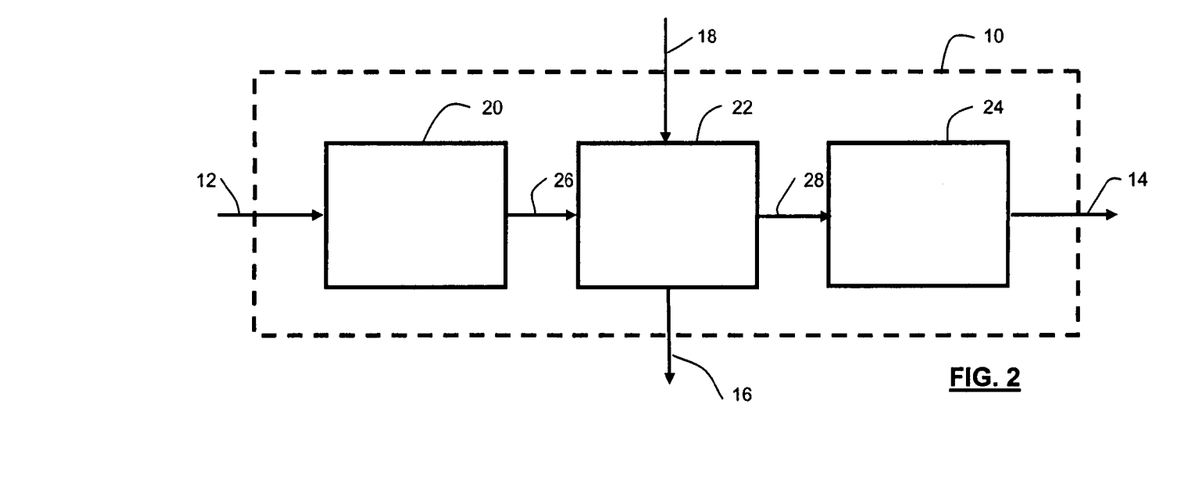
FIG. 2 is a schematic of the wastewater plant of FIG. 1 further detailing primary, and secondary treatment of the wastewater.

As depicted in FIG. 2, the treatment plant 10 may include several different steps or parts. The wastewater 12 is typically pretreated in a primary treatment 20 to remove settleable debris (not shown) from the wastewater 12. The wastewater 26 exits the primary treatment 20 and enters the secondary treatment 22. The oxygen-enriched gas is introduced into the secondary treatment 22 for the removal of the biodegradable organic materials in the wastewater 26. The wastewater 28 exiting the secondary treatment 22 may enter discharge treatment 24. Discharge treatment 24 may include a variety of treatments, such as disinfection with chlorine, depending upon the end use of the water. The present invention, however, is not limited to the use of primary, secondary and discharge treatment. For example, primary and secondary treatment may be used without discharge treatment, or even secondary treatment may be used without separate primary and discharge treatments.

Primary treatment includes, but is not limited to, the removal of material that will either float or readily settle out by gravity. It includes the physical processes of screening, comminution, grit removal, and sedimentation. Secondary treatment removes organic matter that escapes primary treatment and also removes more of the suspended solids. Removal is usually accomplished by biological processes in which microbes consume the organic impurities as food, converting them into carbon dioxide, water, and energy for their own growth and reproduction. As described below, the secondary treatment of the present invention includes an aeration tank followed by a secondary clarifier. Additionally, tertiary treatment (not shown) may also be provided after the secondary treatment. Tertiary treatment includes, but is not limited to, effluent polishing for the removal of additional suspended solids and BOD, phosphorus removal by chemical precipitation, and the like.

Figure 3:
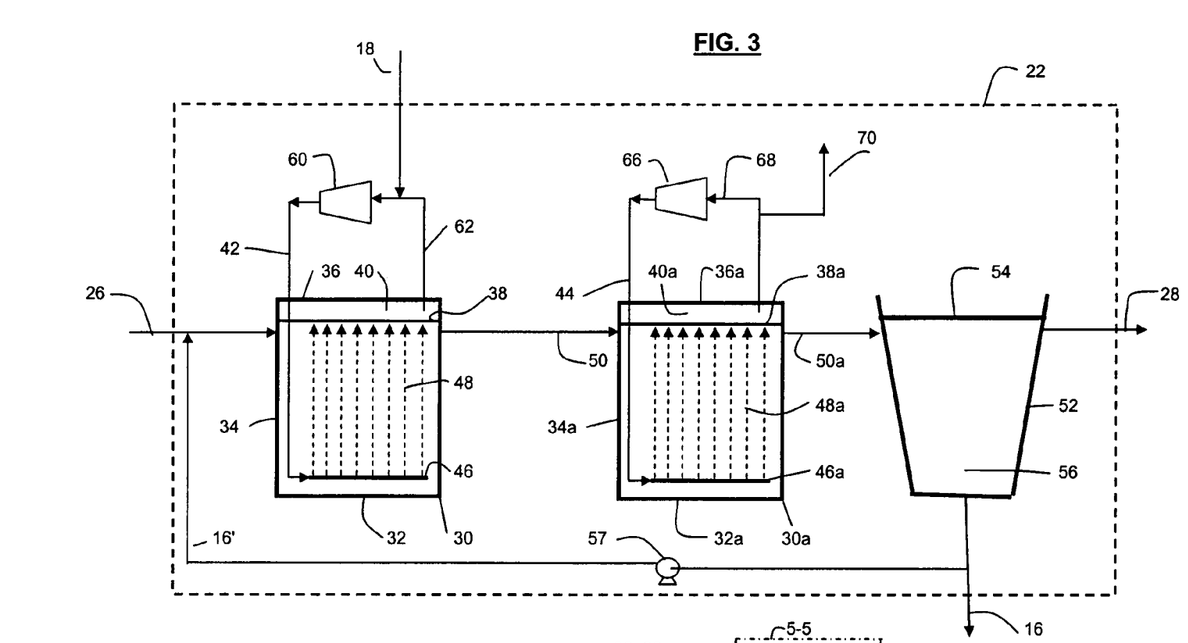
FIG. 3 is a schematic of the secondary treatment of FIG. 2 further detailing aeration of the wastewater.

FIG. 3 further depicts the secondary treatment of the present invention. The secondary treatment 22 includes an aeration vessel 30 or a plurality of aeration vessels 30, 30a operable in series. The present invention is not limited to a particular number of aeration vessels. For example, anywhere from about 1 to about 20 aeration vessels may be operated in series. Further, the secondary treatment 22 may contain banks of multiple aeration vessels operating in parallel (not shown). For simplicity only two aeration vessels 30, 30a are depicted in FIG. 3.

Figure 4:
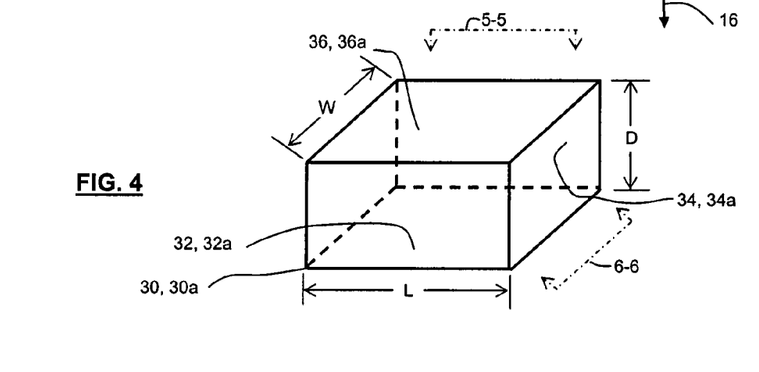
FIG. 4 is a perspective view of an aeration vessel according to the present invention.

The aeration vessels 30, 30a have a top portion 36, 36a and a bottom portion 32, 32a with a side portion 34, 34a extending therebetween. The aeration vessels 30, 30a may be shaped as a parallelepiped or a box as depicted in FIG. 4, but other shapes, for example cylindrical, may suitably be used. In FIG. 4 the length "L" and the Width "W" are shown as being substantially equal, but the invention is not so limited. More importantly, the depth "D" is at least about 20 feet or greater, for example from about 20 feet to about 30 feet or greater. Depths of about 25 feet or greater are also useful. Moreover, a depth of about at least about 30 feet or greater is also useful. The aeration vessels 30, 30a may be of equal dimensions or have different dimensions. The top portion 36, 36a of aeration vessels 30, 30a form a closed vessel where the oxygen-enriched vapor space 40, 40a above the wastewater level 38, 38a is maintained or at least closed from the surrounding environment so as to prevent substantial release of the oxygen-rich gas from the process.

The oxygen-rich gas 42, 44 is introduced into the bottom of the aeration vessels 30, 30a via coarse bubble diffusers 46, 46a. The coarse bubble diffusers 46, 46a, which may be the same or different, having a plurality of hole. Desirably, the holes of a diameter of at least about 0.125 inches. More desirably, the holes have a diameter from about 0.125 inches to about 0.5 inches. The holes in the diffusers are pointed horizontally toward side portion 34, 34a or downward toward the bottom of the aeration vessels 30, 30a to provide a stream of coarse bubbles as depicted by vectors 48, 48a. The diameter of the gas bubbles 48, 48a are approximately equal to the diameter of the orifices from which the gas exits.

The treated wastewater 50 exits aeration vessel 30 and flows into aeration vessel 30a. The treated wastewater 50a exiting from aeration vessel 30a enters a clarifier 52, where a liquid level 54 is maintained and further where solids (not shown) settle toward the bottom 56 of the clarifier 52 and exits the clarifier 52 as sludge 16. A portion 16' of the sludge 16 is recycled back to the aeration vessel 30 via pump 57 to maintain adequate amounts of activated microorganism within the process. The present invention, however, is not limited to the recycle of the sludge or biomass back just to the first aeration vessel, and the biomass may be recycled to other aeration vessels, including the first aeration vessel. The treated wastewater 28 having a substantial amount of the solids removed therefrom exits the clarifier 52.

The oxygen rich gas 18 enters the aeration process via suction line 62, which enters the suction of blower 60. As used herein the term "blower" and its variants refer to mechanical equipment that delivers gas by increasing the pressure of the gas. As used herein, the term blower includes the use of a compressor. The discharge of blower 60 is the oxygen-rich gas 42 for diffuser 46. Much of the oxygen introduced into the aeration tank 30 is consumed by the biological process of the organic waste consumption. Oxygen-rich gas that exits the wastewater is contained in a vapor space 40 above the liquid level 38 in aeration vessel 30 so as to prevent undue loss of enriched oxygen gas.

As a result of the aeration of the wastewater 26 in the aeration vessel 30, the wastewater 50 exiting the aeration vessel 40 is rich in dissolved oxygen. The dissolved oxygen forms, in part, the vapor space 40a. The oxygen-rich gas 68 exiting the vapor space 40a of the aeration vessel 30a enters a blower 66 where the discharge is the oxygen rich gas 44 for dispersion through diffuser 46a. A purge 70 may be taken from the oxygen rich gas 68 or from the vapor space 40a so as to control the build-up of certain gasses, such as carbon dioxide, within the system. Desirably, the fresh oxygen rich gas 18 is substantially rich in oxygen, such as at least 90 mole percent or greater. Lower percentages of oxygen, such as from about 50 mole percent or greater may, however, suitably be used. Desirably, the fresh oxygen-rich gas 18 is a high purity oxygen-rich gas stream. Moreover, the present invention is not limited to the introduction of the oxygen-rich gas 18 just into the first aeration vessel 30, and oxygen-rich gas may also be introduced (not shown) into the second aeration vessel 30a.

Figures 5, 6, 7, 8, 9, 10, 11:
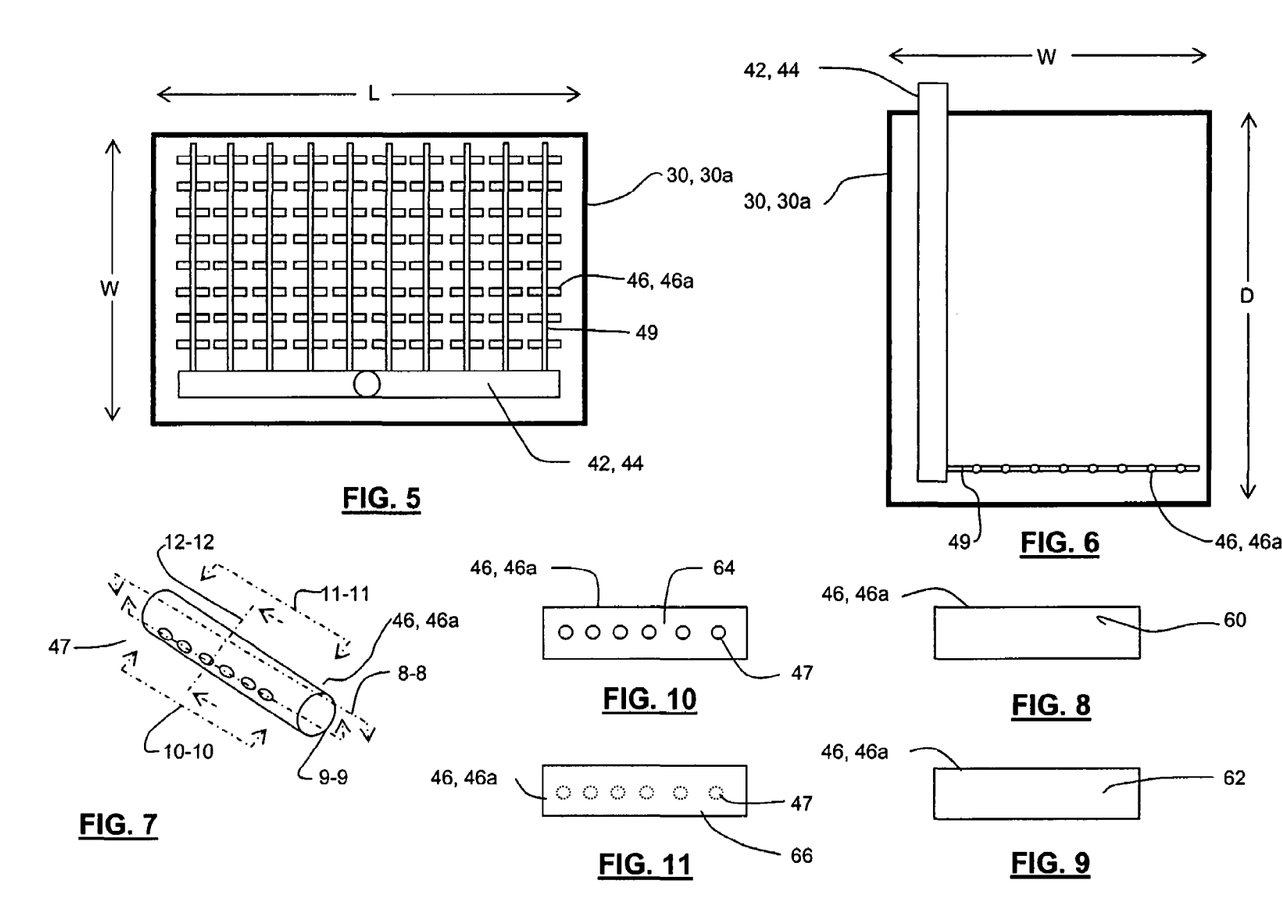
FIG. 5 is a top planar view of the aeration vessel of FIG. 4 taken along the 5—5 axis further detailing a distribution of gas diffusers at the bottom of the vessel.
FIG. 6 is a side planar view of the aeration vessel of FIG. 4 taken along the 5—5 axis further detailing the distribution of gas diffusers at the bottom of the vessel.
FIG. 7 is perspective view of a gas diffuser according to the present invention.
FIG. 8 is a top planar view of the gas diffuser of FIG. 7 taken along the 8—8 axis.
FIG. 9 is a bottom planar view of the gas diffuser of FIG. 7 taken along the 9—9 axis.
FIG. 10 is a side planar view of the gas diffuser of FIG. 7 taken along the 10—10 axis.
FIG. 11 is a side planar view of the gas diffuser of FIG. 7 taken along the 11—11 axis.

FIG. 5 is a top planar view of the aeration vessel 30, 30a of FIG. 4 showing a plurality of gas diffusers 46, 46a. The gas diffusers 46, 46a are placed to substantially extend along the bottom portion of the aeration vessel 30, 30a so that, under proper conditions, the wastewater and the microbes remain in suspension without substantial settling of the solids and also to provide a substantially uniform medium. FIG. 6 is a side elevational view showing that the gas diffusers 46, 46a are disposed substantially toward the bottom of the aeration vessels 30, 30a.

FIG. 7 is a perspective view of the gas diffuser 46, 46a having a plurality of orifices 47. The diameter of the orifices 47 may be of equal size as shown, or the diameter may vary. Further, although the orifices 47 are shown to be substantially circular, the present invention is not so limited and other orifice shapes may suitably be used. As depicted in FIGS. 8–11 the orifices 47 are desirably located at or near the horizontal side portions of the diffuser 46, 46a. The present invention, however, is not so limited and some non-horizontally extending orifices, such as vertically downward and/or vertically upward, may suitably be used. In more detail, FIG. 8 is a top planar view of gas diffusers 46, 46a taken along the 8—8 axis of FIG. 7, showing the lack of orifices along a top portion 60 of the diffusers 46, 46a. FIG. 9 is a bottom planar view of gas diffusers 46, 46a taken along the 9—9 axis of FIG. 7, showing the lack of orifices along a bottom portion 62 of the diffusers 46, 46a. FIG. 10 is a side planar view of gas diffusers 46, 46a taken along the 10—10 axis of FIG. 7, showing the orifices 47 along a side portion 64 of the diffusers 46, 46a. FIG. 11 is a side planar view of gas diffusers 46, 46a taken along the 11—11 axis of FIG. 7, showing the lack of orifices an opposed side portion 66 of the diffusers 46, 46a.

Figure 12:
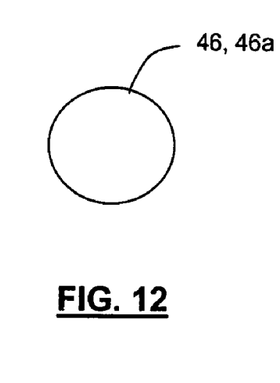
FIG. 12 is a cross-sectional view of the gas diffuser of FIG. 7 taken along the 12—12 axis.
Figure 13:
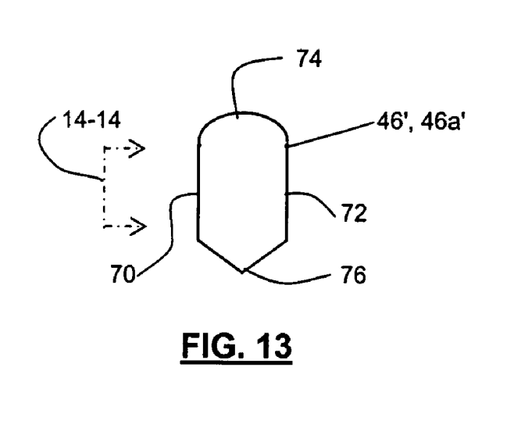
FIG. 13 is a cross-sectional view of an alternate embodiment of the gas diffuser of the present invention.

FIG. 12 is a cross-section view of the gas diffusers 46, 46a of FIG. 7 taken along the 12—12 axis. As depicted in FIG. 12 the gas diffusers 46, 46a are substantially circular. The present invention, however, is not so limited. For example, cross-sectional view of gas diffusers 46', 46a' is depicted in FIG. 13. Gas diffusers 46', 46a' have opposed straight side walls 70, 72 with a curved top portion 74 and a flared bottom portion 76. The flared bottom portion 76 promotes the movement of the biomass around the diffusers 46', 46a'.

Figure 14:
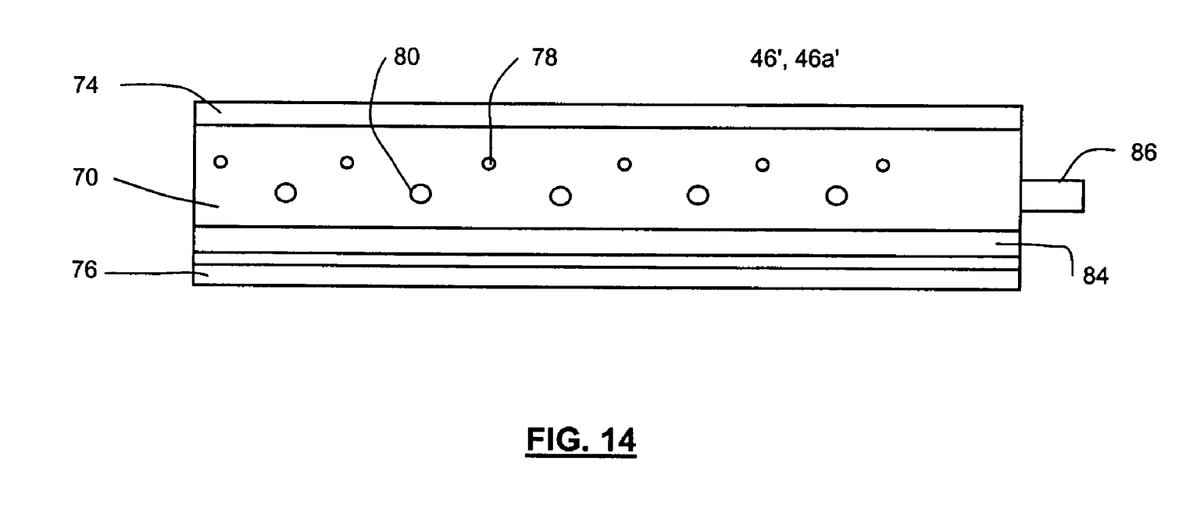
FIG. 14 is side planar view of the gas diffuser of FIG. 13 taken along the 14—14 axis.

FIG. 14 is a side view of the gas diffusers 46', 46a' of FIG. 13 taken along the 14—14 axis. As depicted, the gas diffusers 46', 46a' may contain a plurality of different sized and shaped orifices. For example, the gas diffusers 46', 46a' may contain a plurality of small orifices 78, a plurality of larger orifices 80 and a longitudinally extending slotted orifice 84. Nonlimiting examples of orifice diameters include 0.125 inch diameter for orifices 78, 0.375 inch diameter for orifices 80, and a 0.5 inch diameter for slotted orifice 84. Further, the slotted orifice 84 may extend substantially along the side portion 70, as depicted in FIG. 14, or the slotted orifice may extend partially therealong. Further, although the slotted orifice 84 is depicted as a single slot extending along the side portion 70, the present invention is not so limited and multiple slotted orifices, or other shaped orifices, may suitably be used. The gas diffusers 46', 46a' further include a nozzle 86, which may contain an insert orifice (not shown), delivery of the entering the gas.

In one aspect of the present invention, a wastewater treatment plant is provided. The wastewater treatment plant includes (i) an aeration vessel having a bottom portion, a top portion and a side portion disposed therebetween to hold a quantity of wastewater, the top portion and the bottom portion being disposed at least 20 feet apart from one and the other to define a depth, the depth being capable of being substantially filled with wastewater; (ii) a coarse bubble diffuser disposed proximal to the bottom portion, the diffuser having a plurality of orifices orientated horizontally toward the side portion; the orifices having a diameter of at least 0.125 inches; and (iii) a source of enriched oxygen gas in fluid communication with the diffuser; wherein the enriched oxygen gas exiting the orifices prevents settling of solid components of the wastewater without the use of a mechanical mixer. Desirably, the depth is as least about 20 feet. More desirably, the depth is at least about 30 feet In another aspect of the present invention, the source of enriched oxygen-containing gas includes a blower having an inlet gas flow and a outlet gas flow, the outlet gas flow being at higher pressure that the inlet gas flow, wherein the inlet gas flow comprises a first source of oxygen-rich gas having at least 90 mole percent oxygen and a second source of oxygen-rich gas having greater than 70 mole percent oxygen. Desirably, the first source is a high purity oxygen source, and the second source is a recycled source taken from gas that has exited the gas diffuser.

In another aspect of the present invention, a method for treating wastewater is provided. The method includes the steps of (i) providing a first deep and enclosed aeration vessel; the vessel having a depth of at least about 20 feet; (ii) providing wastewater having dissolved solids to substantially fill the vessel; and (iii) providing enriched oxygen gas at the bottom of the vessel through a coarse bubble diffuser at a sufficient flow to prevent settling of the solids without the need for a mechanical mixer. Desirably, the vessel has a depth of at least about 20 feet, more desirably, a depth of at least about 30 feet.

The step of providing the enriched oxygen gas may further include the step of providing a plurality of orifices at the coarse bubble diffuser, the orifices having a diameter of at least about 0.125 inches to provide a plurality of gas bubbles having a diameter of at least about 0.125 inches. Desirably, the flow of the enriched gas flow is at least about 0.21 standard cubic feet of gas per square-foot of cross-sectional area within the aeration vessel.

The method of present invention may further include a second deep and enclosed aeration vessel having a depth of at least about 20 feet; the second vessel having a coarse bubble diffuser for supplying enriched oxygen gas at a sufficient flow to prevent settling of the solids without the need for a mechanical mixer, wherein the wastewater flows from the first aeration vessel to the second aeration vessel. Desirably, the enriched oxygen gas flow is distributed to the diffusers in both the first and second aeration vessels.

In one aspect of the method of the present invention, the enriched oxygen gas includes high purity oxygen source having an oxygen content of at least about 90 mole percent. The method may further include a blower for supplying the enriched oxygen gas to the diffusers. Further, the enriched oxygen gas may include high purity oxygen source having an oxygen content of at least about 90 mole percent; and gas contained within a vapor space above the wastewater within the aeration tanks, the gas contained with the vapor space having an oxygen content of at least about 60 mole percent.

The apparatus and methods of the present invention are useful for treating wastewater having a biological oxygen demand of at least about 150 mg/L. Desirably, the apparatus and methods of the present invention are energy efficient with an energy requirement for the treating of the wastewater of at least about 3.5 pounds of oxygen per horsepower-hour (lbs. O2/hp-hr) at standard (ASCE) air conditions. The ASCE (American Society Of Civil Engineers) standard air conditions are defined at 36% humidity, 68° F. temperature, ambient pressure (1 atmosphere absolute), and an air density of 0.075 pounds pre cubic foot. Useful energy requirements include from about 3.0 lbs. O2/hp-hr to about 4.5 lbs. O2/hp-hr, desirably from about 3.5 lbs. O2/hp-hr to about 4.5 lbs. O2/hp-hr. Further, the apparatus and methods of the present invention provide for efficient and sufficient aeration. Desirably, the variation of solids with the aeration vessels is less than 10 weight percent.

The invention may be further understood with reference to the following non-limiting examples.

EXAMPLES

Example 1

The aeration system of a commercial wastewater treatment plant included twelve aeration treatment sections operating in parallel. Normally, one train was in standby to handle greater than normal daily treatment requirements. Each train included four stages of aeration, i.e. stages A, B, C and D.

The basis for selecting the coarse bubble aeration system was that of modeling. Since the existing aeration basins were very deep (29.5 feet), coarse bubble diffusion offered the most effective mixing and efficient oxygen transfer. To confirm the performance of the coarse bubble diffused aeration system, Stage A of aeration Train 6 was used. Two hundred twenty coarse bubble diffusers were installed in this basin. The results indicated that the specified oxygen transfer requirements were easily met and the specified mixing was achieved at gas flows as low as 700 standard cubic feet per minute (SCFM).

To further confirm the performance of the floor cover coarse bubble diffused aeration system, the B, C and D Stages of Train 6 were later used and tested. Two hundred twenty-coarse diffusers were installed in each Stage. Onsite testing was conducted and results of these observations and tests indicated the following.

1. No Excessive foaming
2. Uniform mixing, meeting requirements
3. Uniform oxygen with liquid depth
4. Efficient oxygen transfer Based on the confirmation testing, the floor cover coarse bubble aeration system was recommended. The basic design parameters for the coarse bubble floor cover design were developed during the full scale onsite testing, as follows:

Design Criteria

The following design criteria taken from the specifications and developed during full scale onsite testing are as follows;

1. $BOD_5$—Avg. Day—472,000 lb/day (11 trains)
2. $BOD_5$—Max. Day—675,000 lb/day (12 trains)
3. Blowers—Avg. Day—8 (throttled)
4. Blowers—Max. Day—8 (full capacity)
5. Blowers—Max—16 (full capacity)
6. $BOD_5$ Removal—Avg. Day—Stage A—50%—234,000 #/day
   Stage B—24%—113,000 #/day
   Stage C—16%—74,000 #/day
   Stage D—6%—30,000 #/day
   Total—96%—451,000 #/day
   Max. Day—Stage A—44%—295,000 #/day
   Stage B—23%—158,000 #/day
   Stage C—17%—116,000 #/day
   Stage D—8%—55,000 #/day
   Total 92%—624,000 #/day
7. Barometric Pressure—14.65 PSIA
8. TDS—1280 mg/l
9. $O_2/BOD_5$—0.71 $lbO_2$/#$BOD_5$ removed
10. MLSS—2585 mg/l
11. Basin Liquid Depth—29.5 feet
12. Basin Volume—Each Stage—0.74 mg
    Each Train—2.96 mg
    Avg. Day—32.56 mg(11 Trains)
    Max. Day—35.53 mg(12 Trains)
13. $BOD_5$ Loading—Avg. Day
    Stage A—432 #/day—1000 ft$^3$
    Stage B—218 #/day—1000 ft$^3$
    Stage C—115 #/day—1000 ft$^3$
    Stage D—47 #/day—1000 ft$^3$
    Average—203 #/day—1000 ft$^3$
    Max. Day
    Stage A—567 #/day—1000 ft$^3$
    Stage B—319 #/day—1000 ft$^3$
    Stage C—186 #/day—1000 ft$^3$
    Stage D—89 #/day—1000 ft$^3$
    Average—290 #/day—1000 ft$^3$
15. F/M Avg. Day—0.82
    Max. Day—1.02
16. ALPHA Stage A—0.29
    Stage B—0.46
    Stage C—0.48
    Stage D—0.61
    Overall—0.46
17. Oxygen Feed—Avg. Day—223 Tons/day (11 Trains)
    Max. Day—262 Tons/day (12 Trains)
18. Head Space Oxygen Purity—Stage A—87.1%
    Stage B—78.2%
    Stage C—69.3%
    Stage D—40.0%
19. AOR—Avg. Day—Stage A—6,920 #/hr
    Stage B—3,320 #/hr
    Stage C—2,189 #/hr
    Stage D—896 #/hr
    Total—13,325 #/hr
    Max. Day Stage A—8,718 #/hr
    Stage B—4,673 #/hr
    Stage C—3,410 #/hr
    Stage D—1,635 #/hr
    Total—18,437 #/hr
20. SOTR—Avg. Day—Stage A—27,680 #/hr
    Stage B—8,336 #/hr
    Stage C—6,600 #/hr
    Stage D—1,997 #/hr
    Total—44,613 #/hr
    Max. Day—Stage A—33,444 #/hr
    Stage B—10,882 #/hr
    Stage C—7,531 #/hr
    Stage D—3,172 #/hr
    Total—55,029 #/hr
21. Number of diffuser per Stage—220 (all Stages, all Trains)
22. Gas Flow/Stage—Avg. Day—Stage A—2,166 SCFM
    Stage B—777 SCFM
    Stage C—700 SCFM
    Stage D—700 SCFM
    Max Day—Stage A—2,384 SCFM
    Stage B—920 SCFM
    Stage C—731 SCFM
    Stage D—996 SCFM
23. Blower $HP_M$/Stage—Avg. Day Stage A—166 $HP_M$
    Stage B—60 $HP_M$
    Stage C—55 $HP_M$
    Stage D—55 $HP_M$
    Total/Train—336 $HP_M$
    Max. Day Stage A—186 $HP_M$
    Stage B—72 $HP_M$
    Stage C—57 $HP_M$
    Stage D—81 $HP_M$
    Total/Train—396 $HP_M$
24. Operating Pressure—Avg. Day Stage A—14.0 PSIG
    Stage B—13.6 PSIG
    Stage C—13.6 PSIG
    Stage D—13.6 PSIG
    Max. Day—Stage A—14.3 PSIG
    Stage B—14.0 PSIG
    Stage C—13.6 PSIG
    Stage D—14.6 PSIG
25. Design SOTE—Max. Day—29.5%

The detail designs for the following conditions are included in Tables 1-III:

A.) Average Day (472,000 # $BOD_5$/day)
B.) Maximum Day (675,000 # $BOD_5$/day)
C.) Maximum Observed (887,000 # $BOD_5$/day)

TABLE I

AERATION BASIN DESIGN CONSIDERATIONS Summary - Average Day

| | Stage A | Stage B | Stage C | Stage D | System |
|---|---|---|---|---|---|
| $BOD_5$ Loading, Lb/Day | 472,000 | 237,779 | 125,402 | 51,320 | 472,000 |
| $BOD_5$ Removal, % | 49.62% | 47.26% | 59.08% | 59.08% | NA |
| $BOD_5$ Removal, % Overall | 49.62% | 23.81% | 15.70% | 6.42% | 95.55% |
| TDS, mg/l, influent (For Beta Determination) | 1,280 | 1,280 | 1,280 | 1,280 | 1,280 |
| Barometric Pressure, psia | 14.65 | 14.65 | 14.65 | 14.65 | 14.65 |
| $BOD_5$ Removed, Lb/day | 234,221 | 112,375 | 74,081 | 30,317 | 450,997 |
| AERATION BASIN DESIGN CONSIDERATIONS | | | | | |
| lb $O_2$/lb $BOD_5$ Required | 0.71 | 0.71 | 0.71 | 0.71 | 0.71 |
| MLSS, mg/L | 2,409 | 2,634 | 2,648 | 2,652 | 2,586 |
| MLVSS, mg/L | 1,937 | 2,123 | 2,136 | 2,141 | 2,084 |
| Basin Liquid Depth (ft.) | 29.50 | 29.50 | 29.50 | 29.50 | 29.50 |
| Total Aeration Volume, mil. gal. | 8.17 | 8.17 | 8.17 | 8.17 | 32.67 |
| Number of Aeration Basin Basins in Operation | 11.00 | 11.00 | 11.00 | 11.00 | 11.00 |
| Volume of Individual Aeration Basin, mil. gal. | 0.74 | 0.74 | 0.74 | 0.74 | 0.74 |
| Aeration Basin Organic Loading, lb/Day/1000 $Ft^3$ | 432.39 | 217.82 | 114.88 | 47.01 | 203.02 |
| AOR Req'd Lb $O_2$/day | 166,087 | 79,685 | 52,531 | 21,498 | 319,802 |
| AOR Req'd Lb $O_2$/hr | 6,920 | 3,320 | 2,189 | 896 | 13,325 |
| AOR Req'd Lb $O_2$/hr/Basin | 629 | 302 | 199 | 81 | 1,211 |
| $O_2$ Uptake Rate, mg/l/hr | 101.6 | 48.7 | 32.1 | 13.2 | 48.9 |
| Basin Volume, mil. lb. | 68.1 | 68.1 | 68.1 | 68.1 | 272.5 |
| Basin Volume, $Ft^3$ | 1,091,618 | 1,091,618 | 1,091,618 | 1,091,618 | 4,366,472 |
| Basin Floor Area - $Ft^2$ | 37,004 | 37,004 | 37,004 | 37,004 | 148,016 |
| Floor Area Used for Aeration Installation - $Ft^2$ | 37,004 | 37,004 | 37,004 | 37,004 | 148,016 |
| Basin Retention Time (d) | 0.03 | 0.03 | 0.03 | 0.03 | 0.11 |
| Basin Retention Time (hr) | 0.68 | 0.68 | 0.68 | 0.68 | 2.70 |
| F/m ratio | 2.65 | 1.33 | 0.70 | 0.28 | 0.82 |
| Solid Inventory, Lb TSS | 177,900 | 179,451 | 180,344 | 180,658 | 718,352 |
| SOTR CONVERSION | | | | | |
| Wastewater Temperature, °C. | 25.0 | 25.0 | 25.0 | 25.0 | 25.0 |
| Diffuser Water Depth, ft | 28.75 | 28.75 | 28.75 | 28.75 | 28.75 |
| Alpha (α) Factor | 0.29 | 0.46 | 0.48 | 0.61 | 0.46 |
| Basin DO conc. (Cl), mg/l | 6.00 | 5.00 | 10.22 | 5.06 | 6.57 |
| Beta (β) Factor | 0.99 | 0.99 | 0.99 | 0.99 | 0.99 |
| Equivalent Depth Factor | 0.25 | 0.25 | 0.25 | 0.25 | 0.25 |
| Theta (Q) Factor | 1.024 | 1.024 | 1.024 | 1.024 | 1.024 |
| C* (surface saturation, Std. Meth.) | 8.26 | 8.26 | 8.26 | 8.26 | 8.26 |
| Oxygen Purity (%) | 87.06% | 78.24% | 69.25% | 40.00% | 68.64% |
| Csw, mg/l, Site Basin Saturation | 41.49 | 37.28 | 33.00 | 19.06 | 32.71 |
| Css, mg/l, Std. Basin Saturation | 45.77 | 41.13 | 36.41 | 21.03 | 36.09 |
| β*Csw, mg/l | 41.13 | 36.96 | 32.71 | 18.89 | 32.42 |
| Std. $O_2$ Transfer Rate, Lb $O_2$/day | 664,314 | 200,065 | 158,407 | 47,919 | 1,070,706 |
| Std. $O_2$ Transfer Rate, Lb $O_2$/hr | 27,680 | 8,336 | 6,600 | 1,997 | 44,613 |
| Std. $O_2$ Transfer Rate, Lb $O_2$/hr/Basin | 2,516 | 758 | 600 | 182 | 4,056 |
| Std. $O_2$ Transfer Rate, Lb $O_2$/hr (Air Basis) | 6,661 | 2,232 | 1,997 | 1,046 | 11,935 |
| Std. $O_2$ Transfer Rate, Lb $O_2$/hr/Basin (Air Basis) | 606 | 203 | 182 | 95 | 1,085 |
| $KLa_{20}$ - /hr | 8.87 | 2.97 | 2.66 | 1.39 | 3.97 |
| $O_2$ Feed Rate, Tons per Day | 223.30 | 130.00 | 81.61 | 37.87 | 223.30 |
| $O_2$ Feed Rate, Tons per Day/Basin | 20.30 | 11.82 | 7.42 | 3.44 | 20.30 |
| $O_2$ Feed Rate, Lb $O_2$ per Day | 446,600 | 259,997 | 163,214 | 75,750 | 446,600 |
| $O_2$ Feed Rate, Lb $O_2$ per Hr | 18,608 | 10,833 | 6,801 | 3,156 | 18,608 |
| $O_2$ Feed Purity | 95% | 95% | 95% | 95% | 95% |
| $O_2$ Density, Lb/$Ft^3$ | 0.0845 | 0.0845 | 0.0845 | 0.0845 | 0.0845 |
| Inert Feed, % | 5% | 6% | 9% | 20% | 10% |
| Inerts in Feed, Lb/hr | 979.4 | 636.6 | 636.6 | 636.6 | 722.3 |
| Gas Flow Rate, $Ft^3$/min | 3,863.5 | 2,249.2 | 1,411.9 | 655.3 | 2,045.0 |
| $O_2$ in Off Gas, Lb $O_2$ per Hr | 10,833.2 | 6,800.6 | 3,156.2 | 1,539.3 | 1,539.3 |
| $O_2$ Utilization, % | 42% | 37% | 54% | 51% | 91.7% |
| Headspace $O_2$ Purity (%) | 87.1% | 78.2% | 69.3% | 40.0% | 68.6% |
| Headspace Inerts (%) | 8.3% | 8.6% | 16.8% | 29.3% | 15.7% |
| Headspace $N_2$ (%) | 0.6% | 7.2% | 4.0% | 15.7% | 6.9% |
| Headspace $CO_2$ (%) | 4.0% | 6.0% | 10.0% | 15.0% | 8.8% |
| $CO_2$ in Off Gas, Lb $CO_2$ per Hr | 497.7 | 521.5 | 455.7 | 577.2 | 513.1 |
| AERATION EQUIPMENT SIZING | | | | | |
| Aerator Type | Coarse | Coarse | Coarse | Coarse | Coarse |
| Aerator Efficiency Modifier | 112.5% | 112.5% | 112.5% | 112.5% | 112.5% |
| SCFM or HPm per Device | 9.85 | 3.53 | 3.18 | 3.18 | 4.94 |
| Additional System Line Losses, (PSIG) | 0.85 | 1.03 | 1.00 | 1.04 | 0.98 |
| Motor Efficiency | 92.0% | 92.0% | 92.0% | 92.0% | 92.0% |
| Number of Devices/Location | 2 | 2 | 2 | 2 | 2 |
| SOTR, Lb $O_2$/hr/diffuser | 11.44 | 3.44 | 2.73 | 0.83 | 4.61 |
| Hl, in. $H_2O$ | 3.5 | 2.3 | 1.9 | 2.0 | 2.4 |

TABLE I-continued

AERATION BASIN DESIGN CONSIDERATIONS Summary - Average Day

| | Stage A | Stage B | Stage C | Stage D | System |
|---|---|---|---|---|---|
| Number of Diffusers Req'd | 2,420 | 2,420 | 2,420 | 2,420 | 9,680 |
| Number of Diffusers Req'd/Basin | 220 | 220 | 220 | 220 | 880 |
| SCFM Required | 23,829 | 8,552 | 7,705 | 7,705 | 47,791 |
| SCFM Required/Basin | 2,166 | 777 | 700 | 700 | 4,345 |
| LP PSIG | 14.04 | 13.58 | 13.64 | 13.58 | 13.71 |
| HPwire Required | 1,987.5 | 719.7 | 657.1 | 658.6 | 4,022.9 |
| HPmotor Required | 1,828.5 | 662.1 | 604.6 | 605.9 | 3,701.1 |
| HPmotor Required/Basin | 166.2 | 60.2 | 55.0 | 55.1 | 336.5 |
| HPwater Delivered (Est Eff - 60%) | 1,192.5 | 431.8 | 394.3 | 395.2 | 2,413.7 |
| Mixing Level (HP/1000 $Ft^3$) | 1.09 | 0.40 | 0.36 | 0.36 | 0.55 |
| Mixing Flow (SCFM/1000 $Ft^3$) | 21.83 | 7.83 | 7.06 | 7.06 | 10.95 |
| Basin Turnover Time (min) | 13.3 | 36.6 | 40.1 | 40.0 | 32.5 |
| SAE lb $O_2$/hr/HPwire | 13.93 | 11.58 | 10.04 | 3.03 | 9.65 |
| SAE lb $O_2$/hr/HPmotor | 15.14 | 12.59 | 10.92 | 3.30 | 10.49 |
| AAE lb $O_2$/hr/HPmotor | 3.78 | 5.01 | 3.62 | 1.48 | 3.47 |
| SOTE % | 27.0% | 25.2% | 25.0% | 25.0% | 25.5% |
| AOTE % | 41.8% | 37.2% | 53.6% | 51.2% | 46.0% |
| Diffuser Density Diff/$Ft^2$ | 0.07 | 0.07 | 0.07 | 0.07 | 0.07 |
| Aeration Spacing $Ft^2$/Diff | 15.3 | 15.3 | 15.3 | 15.3 | 15.3 |

TABLE II

AERATION BASIN DESIGN CONSIDERATIONS Summary - Maximum Day

| | Stage A | Stage B | Stage C | Stage D | System |
|---|---|---|---|---|---|
| $BOD_5$ Loading, Lb/Day | 675,000 | 379,919 | 221,737 | 106,337 | 675,000 |
| $BOD_5$ Removal, % | 43.72% | 41.63% | 52.04% | 52.04% | NA |
| $BOD_5$ Removal, % Overall | 43.72% | 23.43% | 17.10% | 8.20% | 92.44% |
| TDS, mg/l, influent (For Beta Determination) | 1,280 | 1,280 | 1,280 | 1,280 | 1,280 |
| Barometric Pressure, psia | 14.65 | 14.65 | 14.65 | 14.65 | 14.65 |
| $BOD_5$ Removed, Lb/day | 295,081 | 158,175 | 115,397 | 55,341 | 624,003 |
| AERATION BASIN DESIGN CONSIDERATIONS | | | | | |
| lb $O_2$/lb $BOD_5$ Required | 0.71 | 0.71 | 0.71 | 0.71 | 0.71 |
| MLSS, mg/L | 2,409 | 2,659 | 2,679 | 2,688 | 2,609 |
| MLVSS, mg/L | 2,018 | 2,232 | 2,253 | 2,261 | 2,191 |
| Basin Liquid Depth (ft.) | 29.50 | 29.50 | 29.50 | 29.50 | 29.50 |
| Total Aeration Volume, mil. gal. | 8.91 | 8.91 | 8.91 | 8.91 | 35.64 |
| Number of Aeration Basin Basins in Operation | 12.00 | 12.00 | 12.00 | 12.00 | 12.00 |
| Volume of Individual Aeration Basin, mil. gal. | 0.74 | 0.74 | 0.74 | 0.74 | 0.74 |
| Aeration Basin Organic Loading, lb/Day/1000 $Ft^3$ | 566.82 | 319.03 | 186.20 | 89.29 | 290.34 |
| AOR Req'd Lb $O_2$/day | 209,243 | 112,163 | 81,829 | 39,242 | 442,477 |
| AOR Req'd Lb $O_2$/hr | 8,718 | 4,673 | 3,410 | 1,635 | 18,437 |
| AOR Req'd Lb $O_2$/hr/Basin | 727 | 389 | 284 | 136 | 1,536 |
| $O_2$ Uptake Rate, mg/l/hr | 117.3 | 62.9 | 45.9 | 22.0 | 62.0 |
| Basin Volume, mil. lb. | 74.3 | 74.3 | 74.3 | 74.3 | 297.2 |
| Basin Volume, $Ft^3$ | 1,190,856 | 1,190,856 | 1,190,856 | 1,190,856 | 4,763,424 |
| Basin Floor Area - $Ft^2$ | 40,368 | 40,368 | 40,368 | 40,368 | 161,472 |
| Floor Area Used for Aeration Installation - $Ft^2$ | 40,368 | 40,368 | 40,368 | 40,368 | 161,472 |
| Basin Retention Time (d) | 0.03 | 0.03 | 0.03 | 0.03 | 0.12 |
| Basin Retention Time (hr) | 0.74 | 0.74 | 0.74 | 0.74 | 2.95 |
| F/m ratio | 3.46 | 1.92 | 1.11 | 0.53 | 1.02 |
| Solid Inventory, Lb TSS | 195,251 | 197,599 | 199,095 | 199,710 | 791,656 |
| SOTR CONVERSION | | | | | |
| Wastewater Temperature, °C. | 25.0 | 25.0 | 25.0 | 25.0 | 25.0 |
| Diffuser Water Depth, ft | 28.75 | 28.75 | 28.75 | 28.75 | 28.75 |
| Alpha (a) Factor | 0.29 | 0.46 | 0.48 | 0.61 | 0.46 |
| Basin DO conc. (Cl), mg/l | 4.50 | 2.50 | 2.00 | 3.00 | 3.00 |
| Beta ($\beta$) Factor | 0.99 | 0.99 | 0.99 | 0.99 | 0.99 |
| Equivalent Depth Factor | 0.25 | 0.25 | 0.25 | 0.25 | 0.25 |
| Theta (Q) Factor | 1.024 | 1.024 | 1.024 | 1.024 | 1.024 |
| C* (surface saturation, Std. Meth.) | 8.26 | 8.26 | 8.26 | 8.26 | 8.26 |
| Oxygen Purity (%) | 87.06% | 78.24% | 69.25% | 40.00% | 68.64% |
| Csw, mg/l, Site Basin Saturation | 41.49 | 37.28 | 33.00 | 19.06 | 32.71 |
| Css, mg/l, Std. Basin Saturation | 45.77 | 41.13 | 36.41 | 21.03 | 36.09 |
| $\beta$*Csw, mg/l | 41.13 | 36.96 | 32.71 | 18.89 | 32.42 |
| Std. $O_2$ Transfer Rate, Lb $O_2$/day | 802,655 | 261,174 | 180,746 | 76,123 | 1,320,697 |
| Std. $O_2$ Transfer Rate, Lb $O_2$/hr | 33,444 | 10,882 | 7,531 | 3,172 | 55,029 |
| Std. $O_2$ Transfer Rate, Lb $O_2$/hr/Basin | 2,787 | 907 | 628 | 264 | 4,586 |
| Std. $O_2$ Transfer Rate, Lb $O_2$/hr (Air Basis) | 8,048 | 2,914 | 2,278 | 1,661 | 14,901 |

TABLE II-continued

AERATION BASIN DESIGN CONSIDERATIONS Summary - Maximum Day

|  | Stage A | Stage B | Stage C | Stage D | System |
|---|---|---|---|---|---|
| Std. $O_2$ Transfer Rate, Lb $O_2$/hr/Basin (Air Basis) | 671 | 243 | 190 | 138 | 1,242 |
| $KLa_{20}$ - /hr | 9.82 | 3.56 | 2.78 | 2.03 | 4.55 |
| $O_2$ Feed Rate, Tons per Day | 261.63 | 149.31 | 88.96 | 44.62 | 261.63 |
| $O_2$ Feed Rate, Tons per Day/Basin | 21.80 | 12.44 | 7.41 | 3.72 | 21.80 |
| $O_2$ Feed Rate, Lb $O_2$ per Day | 523,260 | 298,630 | 177,918 | 89,250 | 523,260 |
| $O_2$ Feed Rate, Lb $O_2$ per Hr | 21,803 | 12,443 | 7,413 | 3,719 | 21,803 |
| $O_2$ Feed Purity | 95% | 95% | 95% | 95% | 95% |
| $O_2$ Density, Lb/$Ft^3$ | 0.0845 | 0.0845 | 0.0845 | 0.0845 | 0.0845 |
| Inert Feed, % | 5% | 5% | 8% | 15% | 8% |
| Inerts in Feed, Lb/hr | 1,147.5 | 573.8 | 573.8 | 573.8 | 717.2 |
| Gas Flow Rate, $Ft^3$/min | 4,526.6 | 2,583.4 | 1,539.1 | 772.1 | 2,355.3 |
| $O_2$ in Off Gas, Lb $O_2$ per Hr | 12,442.9 | 7,413.2 | 3,718.7 | 1,656.2 | 1,656.2 |
| $O_2$ Utilization, % | 43% | 40% | 50% | 55% | 92.4% |
| Headspace $O_2$ Purity (%) | 87.1% | 78.2% | 69.3% | 40.0% | 68.6% |
| Headspace Inerts (%) | 8.4% | 7.2% | 13.4% | 25.7% | 13.7% |
| Headspace $N_2$ (%) | 0.5% | 8.6% | 7.4% | 19.3% | 8.9% |
| Headspace $CO_2$ (%) | 4.0% | 6.0% | 10.0% | 15.0% | 8.8% |
| $CO_2$ in Off Gas, Lb $CO_2$ per Hr | 497.7 | 521.5 | 455.7 | 577.2 | 513.1 |
| AERATION EQUIPMENT SIZING | | | | | |
| Aerator Type | Coarse | Coarse | Coarse | Coarse | Coarse |
| Aerator Efficiency Modifier | 112.5% | 112.5% | 112.5% | 112.5% | 112.5% |
| SCFM or HPm per Device | 10.84 | 4.18 | 3.32 | 4.53 | 5.72 |
| Additional System Line Losses, (PSIG) | 1.35 | 1.41 | 1.07 | 1.95 | 1.44 |
| Motor Efficiency | 92.0% | 92.0% | 92.0% | 92.0% | 92.0% |
| Number of Devices/Location | 2 | 2 | 2 | 2 | 2 |
| SOTR, Lb $O_2$/hr/diffuser | 12.67 | 4.12 | 2.85 | 1.20 | 5.21 |
| Hl, in. $H_2O$ | 4.2 | 3.2 | 2.1 | 3.8 | 3.3 |
| Number of Diffusers Req'd | 2,640 | 2,640 | 2,640 | 2,640 | 10,560 |
| Number of Diffusers Req'd/Basin | 220 | 220 | 220 | 220 | 880 |
| SCFM Required | 28,614 | 11,036 | 8,766 | 11,947 | 60,363 |
| SCFM Required/Basin | 2,384 | 920 | 731 | 996 | 5,030 |
| LP PSIG | 14.32 | 13.98 | 13.60 | 14.55 | 14.11 |
| HPwire Required | 2,421 | 942 | 743 | 1,057 | 5,162.5 |
| HPmotor Required | 2,227 | 866 | 683 | 973 | 4,749.5 |
| HPmotor Required/Basin | 186 | 72 | 57 | 81 | 395.8 |
| HPwater Delivered (Est Eff - 60%) | 1,453 | 565 | 446 | 634 | 3,097.5 |
| Mixing Level (HP/1000 $Ft^3$) | 1.22 | 0.47 | 0.37 | 0.53 | 0.65 |
| Mixing Flow (SCFM/1000 $Ft^3$) | 24.03 | 9.27 | 7.36 | 10.03 | 12.67 |
| Basin Turnover Time (min) | 11.9 | 30.6 | 38.7 | 27.2 | 27.1 |
| SAE lb $O_2$/hr/HPwire | 13.81 | 11.56 | 10.14 | 3.00 | 9.63 |
| SAE lb $O_2$/hr/HPmotor | 15.02 | 12.56 | 11.02 | 3.26 | 10.46 |
| AAE lb $O_2$/hr/HPmotor | 3.91 | 5.40 | 4.99 | 1.68 | 3.99 |
| SOTE % | 27.1% | 25.5% | 25.1% | 25.6% | 25.8% |
| AOTE % | 42.9% | 40.4% | 49.8% | 55.5% | 47.2% |
| Diffuser Density Diff/$Ft^2$ | 0.07 | 0.07 | 0.07 | 0.07 | 0.07 |
| Aeration Spacing $Ft^2$/Diff | 15.3 | 15.3 | 15.3 | 15.3 | 15.3 |

TABLE III

AERATION BASIN DESIGN CONSIDERATIONS Summary - Maximum Observed OUR

|  | Stage A | Stage B | Stage C | Stage D | System |
|---|---|---|---|---|---|
| $BOD_5$ Loading, Lb/Day | 887,342 | 501,614 | 293,934 | 141,819 | 887,342 |
| $BOD_5$ Removal, % | 43.47% | 41.40% | 51.75% | 51.75% | NA |
| $BOD_5$ Removal, % Overall | 43.47% | 23.40% | 17.14% | 8.27% | 92.29% |
| TDS, mg/l, influent (For Beta Determination) | 1,280 | 1,280 | 1,280 | 1,280 | 1,280 |
| Barometric Pressure, psia | 14.65 | 14.65 | 14.65 | 14.65 | 14.65 |
| $BOD_5$ Removed, Lb/day | 385,728 | 207,668 | 152,111 | 73,391 | 818,898 |
| AERATION BASIN DESIGN CONSIDERATIONS | | | | | |
| lb $O_2$/lb $BOD_5$ Required | 0.71 | 0.71 | 0.71 | 0.71 | 0.71 |
| MLSS, mg/L | 2,409 | 2,693 | 2,719 | 2,730 | 2,638 |
| MLVSS, mg/L | 2,084 | 2,335 | 2,362 | 2,373 | 2,288 |
| Basin Liquid Depth (ft.) | 29.50 | 29.50 | 29.50 | 29.50 | 29.50 |
| Total Aeration Volume, mil. gal. | 8.91 | 8.91 | 8.91 | 8.91 | 35.64 |
| Number of Aeration Basin Basins in Operation | 12.00 | 12.00 | 12.00 | 12.00 | 12.00 |
| Volume of Individual Aeration Basin, mil. gal. | 0.74 | 0.74 | 0.74 | 0.74 | 0.74 |
| Aeration Basin Organic Loading, lb/Day/1000 $Ft^3$ | 745.13 | 421.22 | 246.83 | 119.09 | 383.07 |
| AOR Req'd Lb $O_2$/day | 273,521 | 147,259 | 107,862 | 52,042 | 580,685 |
| AOR Req'd Lb $O_2$/hr | 11,397 | 6,136 | 4,494 | 2,168 | 24,195 |

TABLE III-continued

AERATION BASIN DESIGN CONSIDERATIONS Summary - Maximum Observed OUR

| | Stage A | Stage B | Stage C | Stage D | System |
|---|---|---|---|---|---|
| AOR Req'd Lb $O_2$/hr/Basin | 950 | 511 | 375 | 181 | 2,016 |
| $O_2$ Uptake Rate, mg/l/hr | 153.4 | 82.6 | 60.5 | 29.2 | 81.4 |
| Basin Volume, mil. lb. | 74.3 | 74.3 | 74.3 | 74.3 | 297.2 |
| Basin Volume, $Ft^3$ | 1,190,856 | 1,190,856 | 1,190,856 | 1,190,856 | 4,763,424 |
| Basin Floor Area - $Ft^2$ | 40,368 | 40,368 | 40,368 | 40,368 | 161,472 |
| Floor Area Used for Aeration Installation - $Ft^2$ | 40,368 | 40,368 | 40,368 | 40,368 | 161,472 |
| Basin Retention Time (d) | 0.03 | 0.03 | 0.03 | 0.03 | 0.12 |
| Basin Retention Time (hr) | 0.74 | 0.74 | 0.74 | 0.74 | 2.95 |
| F/m ratio | 4.50 | 2.51 | 1.45 | 0.70 | 1.28 |
| Solid Inventory, Lb TSS | 197,014 | 200,087 | 202,053 | 202,866 | 802,019 |
| SOTR CONVERSION | | | | | |
| Wastewater Temperature, ° C. | 25.0 | 25.0 | 25.0 | 25.0 | 25.0 |
| Diffuser Water Depth, ft | 28.75 | 28.75 | 28.75 | 28.75 | 28.75 |
| Alpha (a) Factor | 0.29 | 0.46 | 0.48 | 0.61 | 0.46 |
| Basin DO conc. (Cl), mg/l | 4.50 | 2.50 | 2.00 | 2.90 | 2.98 |
| Beta (β) Factor | 0.99 | 0.99 | 0.99 | 0.99 | 0.99 |
| Equivalent Depth Factor | 0.25 | 0.25 | 0.25 | 0.25 | 0.25 |
| Theta (Q) Factor | 1.024 | 1.024 | 1.024 | 1.024 | 1.024 |
| C* (surface saturation, Std. Meth.) | 8.26 | 8.26 | 8.26 | 8.26 | 8.26 |
| Oxygen Purity (%) | 87.06% | 78.24% | 69.25% | 40.00% | 68.64% |
| Csw, mg/l, Site Basin Saturation | 41.49 | 37.28 | 33.00 | 19.06 | 32.71 |
| Css, mg/l, Std. Basin Saturation | 45.77 | 41.13 | 36.41 | 21.03 | 36.09 |
| β*Csw, mg/l | 41.13 | 36.96 | 32.71 | 18.89 | 32.42 |
| Std. $O_2$ Transfer Rate, Lb $O_2$/day | 1,049,224 | 342,895 | 238,250 | 100,322 | 1,730,690 |
| Std. $O_2$ Transfer Rate, Lb $O_2$/hr | 43,718 | 14,287 | 9,927 | 4,180 | 72,112 |
| Std. $O_2$ Transfer Rate, Lb $O_2$/hr/Basin | 3,643 | 1,191 | 827 | 348 | 6,009 |
| Std. $O_2$ Transfer Rate, Lb $O_2$/hr (Air Basis) | 10,520 | 3,826 | 3,003 | 2,189 | 19,538 |
| Std. $O_2$ Transfer Rate, Lb $O_2$/hr/Basin (Air Basis) | 877 | 319 | 250 | 182 | 1,628 |
| $KLa_{20}$ - /hr | 12.84 | 4.67 | 3.67 | 2.67 | 5.96 |
| $O_2$ Feed Rate, Tons per Day | 342.00 | 197.55 | 119.64 | 62.29 | 342.00 |
| $O_2$ Feed Rate, Tons per Day/Basin | 28.50 | 16.46 | 9.97 | 5.19 | 28.50 |
| $O_2$ Feed Rate, Lb $O_2$ per Day | 684,000 | 395,091 | 239,283 | 124,581 | 684,000 |
| $O_2$ Feed Rate, Lb $O_2$ per Hr | 28,500 | 16,462 | 9,970 | 5,191 | 28,500 |
| $O_2$ Feed Purity | 95% | 95% | 95% | 95% | 95% |
| $O_2$ Density, Lb/$Ft^3$ | 0.0845 | 0.0845 | 0.0845 | 0.0845 | 0.0845 |
| Inert Feed, % | 5% | 5% | 8% | 14% | 8% |
| Inerts in Feed, Lb /hr | 1,500.0 | 750.0 | 750.0 | 750.0 | 937.5 |
| Gas Flow Rate, $Ft^3$/min | 5,917.2 | 3,417.9 | 2,070.0 | 1,077.7 | 3,120.7 |
| $O_2$ in Off Gas, Lb $O_2$ per Hr | 16,462.1 | 9,970.1 | 5,190.9 | 2,609.3 | 2,609.3 |
| $O_2$ Utilization, % | 42% | 39% | 48% | 50% | 90.8% |
| Headspace $O_2$ Purity (%) | 87.1% | 78.2% | 69.3% | 40.0% | 68.6% |
| Headapace Inerts (%) | 8.4% | 7.0% | 12.6% | 22.3% | 12.6% |
| Headspace $N_2$ (%) | 0.6% | 8.8% | 8.1% | 22.7% | 10.0% |
| Headspace $CO_2$ (%) | 4.0% | 6.0% | 10.0% | 15.0% | 8.8% |
| $CO_2$ in Off Gas, Lb $CO_2$ per Hr | 1,195.7 | 1,249.6 | 1,319.3 | 2,044.2 | 1,452.2 |
| AERATION EQUIPMENT SIZING | | | | | |
| Aerator Type | Coarse | Coarse | Coarse | Coarse | Coarse |
| Aerator Efficiency Modifier | 112.5% | 112.5% | 112.5% | 112.5% | 112.5% |
| SCFM or HPm per Device | 13.94 | 5.39 | 4.30 | 5.86 | 7.37 |
| Additional System Line Losses, (PSIG) | 1.35 | 0.25 | 0.19 | 0.87 | 0.67 |
| Motor Efficiency | 92.0% | 92.0% | 92.0% | 92.0% | 92.0% |
| Number of Devices/Location | 2 | 2 | 2 | 2 | 2 |
| SOTR, Lb $O_2$/hr/diffuser | 16.56 | 5.41 | 3.76 | 1.58 | 6.83 |
| Hl, in. $H_2O$ | 1.8 | 1.4 | 0.9 | 1.6 | 1.4 |
| Number of Diffusers Req'd | 2,640 | 2,640 | 2,640 | 2,640 | 10,560 |
| Number of Diffusers Req'd/Basin | 220 | 220 | 220 | 220 | 880 |
| SCFM Required | 36,808 | 14,241 | 11,351 | 15,473 | 77,874 |
| SCFM Required/Basin | 3,067 | 1,187 | 946 | 1,289 | 6,489 |
| LP PSIG | 13.34 | 12.77 | 12.69 | 13.39 | 13.05 |
| HPwire Required | 2,972 | 1,162 | 941 | 1,311 | 6,386.1 |
| HPmotor Required | 2,734 | 1,069 | 866 | 1,206 | 5,875.3 |
| HPmotor Required/Basin | 228 | 89 | 72 | 100 | 489.6 |
| HPwater Delivered (Est Eff - 60%) | 1,783 | 697 | 565 | 786 | 3,831.7 |
| Mixing Level (HP/1000 $Ft^3$) | 1.50 | 0.59 | 0.47 | 0.66 | 0.80 |
| Mixing Flow (SCFM/1000 $Ft^3$) | 30.91 | 11.96 | 9.53 | 12.99 | 16.35 |
| Basin Turnover Time (min) | 9.7 | 24.8 | 30.6 | 21.9 | 21.7 |
| SAE lb $O_2$/hr/HPwire | 14.71 | 12.29 | 10.55 | 3.19 | 10.18 |
| SAE lb $O_2$/hr/HPmotor | 15.99 | 13.36 | 11.46 | 3.47 | 11.07 |
| AAE lb $O_2$/hr/HPmotor | 4.17 | 5.74 | 5.19 | 1.80 | 4.22 |
| SOTE % | 27.6% | 25.9% | 25.5% | 26.1% | 26.3% |

TABLE III-continued

AERATION BASIN DESIGN CONSIDERATIONS Summary - Maximum Observed OUR

|  | Stage A | Stage B | Stage C | Stage D | System |
|---|---|---|---|---|---|
| AOTE % | 42.2% | 39.4% | 47.9% | 49.7% | 44.8% |
| Diffuser Density Diff/Ft$^2$ | 0.07 | 0.07 | 0.07 | 0.07 | 0.07 |
| Aeration Spacing Ft$^2$/Diff | 15.3 | 15.3 | 15.3 | 15.3 | 15.3 |

Diffuser System Design

Based on the above criteria, each stage of each aeration train was selected to have the same number of diffusers. This approach was used to achieve effective distribution of the recirculating gas to the basins while maintaining the required mixing and oxygen transfer.

The organic loading for Average Day conditions were such that Stages A and B designs are controlled by oxygen demand while Stages C and D designs are controlled by minimum power for mixing. The minimum gas flow for mixing is 700 SCFM.

For Maximum Day design, gas flow to all Stages is oxygen transfer controlled. Therefore, mixing is not a design consideration for Maximum Day conditions.

The following are the basic design specification for the coarse bubble diffuser system.

Number of Diffusers—220
Gas flow/diffuser—Variable (3 to 12 SCFM)
All material of construction—316 SS
Orifice sizes—Stage A—9/16"φ
  State B, C & D—3/8"φ
Diffuser Submergence—28.75 feet With the proposed coarse bubble aeration system, the treatment limitation will not be oxygen. The treatment limitation will be the organic loading (F/M). That is, the treatment limit will be based on the effluent BOD$_5$ concentration desired. With all sixteen blowers in operation, excess oxygen will be available in all Stages at a BOD$_5$ loading in excess of 100,000 #/day to each Train. This would be a total aeration system BOD$_5$ loading of over 1,200,000 #/day.

Based on the onsite testing results, full-scale onsite operation of the coarse bubble diffuser and a headloss analysis of the entire piping system, the following conclusions were made.

1. The specified minimum uniform mixing (less than +/−10% MLSS variation) is achieved at gas flow as low as 700 SCFM (60 HP$_M$/Stage).
2. The coarse bubble aeration system recommended consists of 220 uniformly spaced stainless steel wideband diffusers attached to a stainless steel gas header pipe grid.
3. The headspace gas will be circulated through the diffuser system via eight centrifugal compressors.
4. Eight additional new centrifugal compressors will be used for standby capacity.
5. Gas flow will be monitored and controlled at each basin to assure uniform distribution.
6. All other controls and safety equipment required for the handling of oxygen-enriched gas will be included.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A wastewater treatment plant comprising:
an aeration vessel having a bottom portion, a top portion and a side portion disposed therebetween to hold a quantity of wastewater, the top portion and the bottom portion being disposed at least 20 feet apart from one and the other to define a depth, the depth being capable of being substantially filled with wastewater, wherein the top portion encloses the aeration vessel to define a vapor space above the wastewater;
a coarse bubble diffuser disposed proximal to the bottom portion, the diffuser having a plurality of orifices orientated horizontally toward the side portion; the orifices having a diameter of at least 0.125 inches; and
a source of enriched oxygen gas in fluid communication with the diffuser, wherein the source of enriched oxygen-containing gas comprises a blower having an inlet gas flow and a outlet gas flow, the outlet gas flow being at higher pressure that the inlet gas flow, wherein the inlet gas flow comprises a first source of oxygen-rich gas having at least 90 mole percent oxygen and a second source of oxygen-rich gas having greater than 60 mole percent oxygen, the second source being from the vapor space;
wherein the enriched oxygen gas exiting the orifices prevents settling of solid components of the wastewater without the use of a mechanical mixer.

2. The wastewater treatment plant of claim 1, wherein the depth is as least about 25 feet.

3. The wastewater treatment plant of claim 1, wherein the depth is at least about 30 feet.

4. The wastewater treatment plant of claim 1, wherein the second source of oxygen-rich gas has greater than 70 mole percent oxygen.

5. The wastewater treatment plant of claim 1, wherein the first source is a high purity oxygen source.

6. The wastewater treatment plant of claim 1, wherein the second source is a recycled source taken from gas that has exited the gas diffuser.

7. A method for treating wastewater, comprising:
providing a first deep and enclosed aeration vessel; the vessel having a depth of at least about 20 feet;
providing wastewater having dissolved solids to substantially fill the vessel; and
providing enriched oxygen gas at the bottom of the vessel through a coarse bubble diffuser at a sufficient flow to prevent settling of the solids without the need for a mechanical mixer, wherein the enriched oxygen gas comprises a high purity oxygen source having an oxygen content of at least about 90 mole percent and gas contained within a vapor space above the wastewater within the aeration vessel, the gas contained with the vapor space having an oxygen content of at least about 60 mole percent.

8. The method of claim 7, wherein the vessel has a depth of at least about 25 feet.

9. The method of claim 7, wherein the vessel has a depth of at least about 30 feet.

10. The method of claim 7, wherein the step of providing the enriched oxygen gas further comprises:
providing a plurality of orifices at the coarse bubble diffuser, the orifices having a diameter of at least about 0.125 inches to provide a plurality of gas bubbles having a diameter of at least about 0.125 inches.

11. The method of claim 7, wherein the flow of the enriched gas flow is at least about 0.21 standard cubic feet of gas per square-foot of cross-sectional area within the aeration vessel.

12. The method of claim 7, further comprising a second deep and enclosed aeration vessel having a depth of at least about 20 feet; the second vessel having a coarse bubble diffuser for supplying enriched oxygen gas at a sufficient flow to prevent settling of the solids without the need for a mechanical mixer, wherein the wastewater flows from the first aeration vessel to the second aeration vessel.

13. The method of claim 12, wherein the enriched oxygen gas flow is distributed to the diffusers in both the first and second aeration vessels.

14. The method of claim 12, wherein the enriched oxygen gas to the diffuser of the second aeration vessel is the same as the enriched oxygen gas to the diffuser of the first aeration vessel.

15. The method of claim 13, further comprising a blower for supplying the enriched oxygen gas to the diffusers.

16. The method of claim 15, wherein
the gas contained within vapor spaces above the wastewater within the first and second aeration vessels have an oxygen content of at least about 70 mole percent.

17. The method of claim 7, wherein the wastewater has a biological oxygen demand of at least about 150 mg/L.

18. The method of claim 17, wherein an energy requirement for the treating of the wastewater is at least about 3.5 pounds of oxygen per horsepower-hour.

19. The method of claim 7, wherein the variation of solids is less than 10 weight percent throughout the aeration vessel.

* * * * *